UNITED STATES PATENT OFFICE.

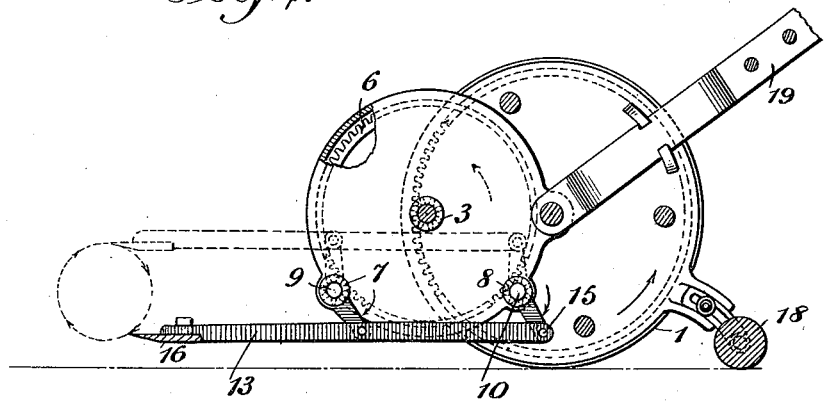
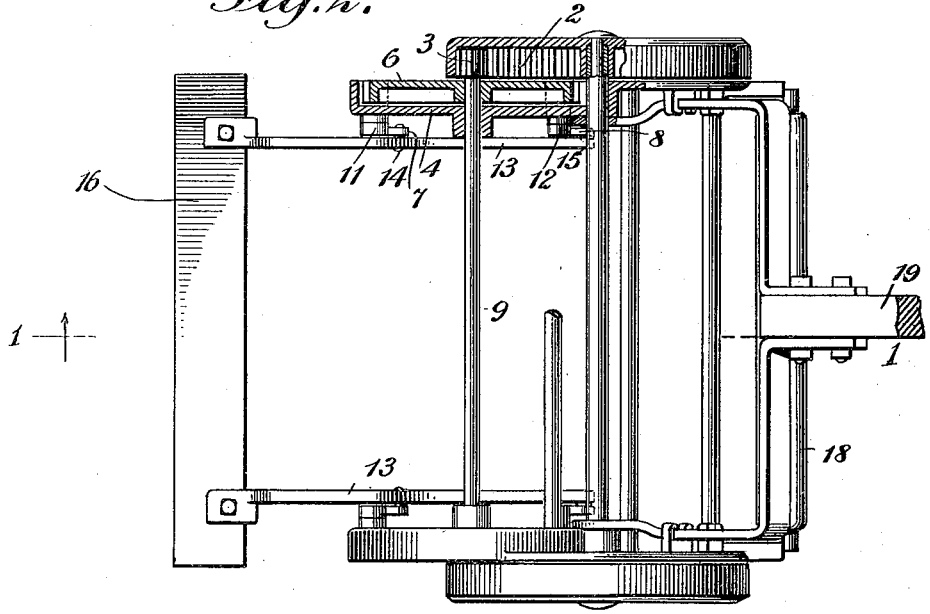
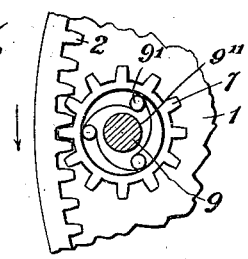

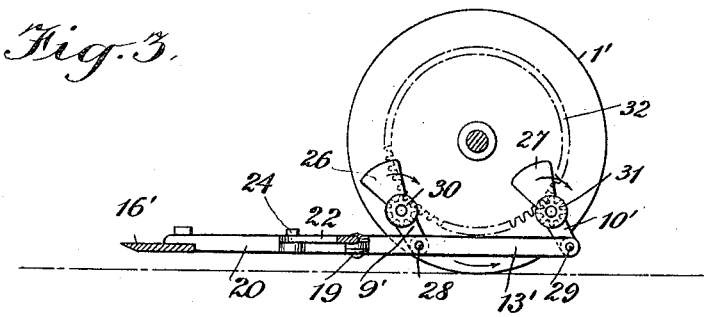
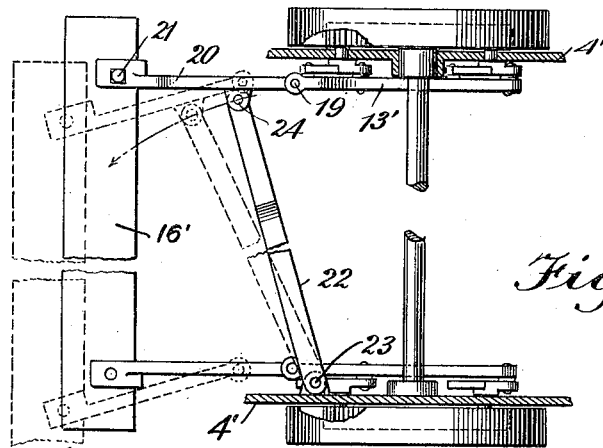
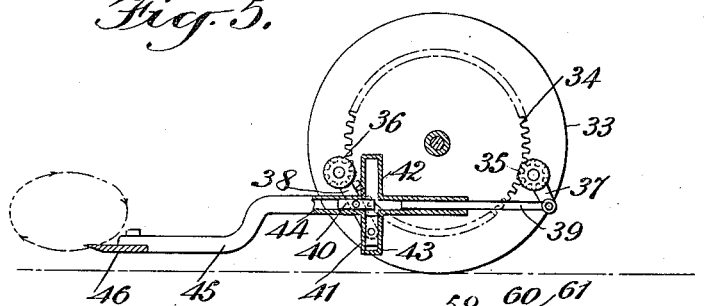
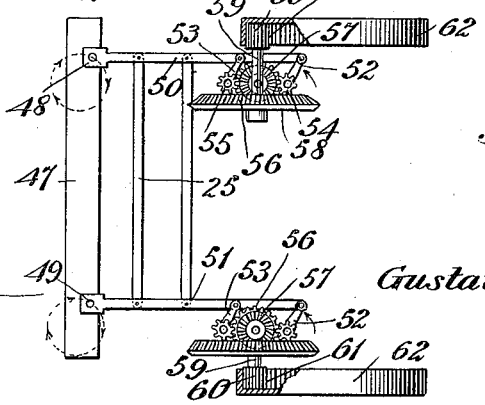

GUSTAV P. HELFRICH, OF NEW YORK, N. Y.

MOWER.

1,134,851.  Specification of Letters Patent.  Patented Apr. 6, 1915.

Application filed May 14, 1914. Serial No. 838,492.

*To all whom it may concern:*

Be it known that I, GUSTAV P. HELFRICH, a citizen of the United States, and a resident of the city of New York, borough of the Bronx, county of the Bronx, and State of New York, have invented a new and Improved Mower, of which the following is a full, clear, and exact description.

This invention relates to improvements in mowers, and particularly to an improved structure adapted to give a circular motion to the cutting blade together with a forward motion thereof.

The object in view is to provide an improved mower structure whereby the cutting motion is in the direction of travel of the mower.

Another object of the invention is to provide a mower with an improved power mechanism associated with the cutting knife whereby the cutting knife may produce a vertical rotary movement, the forward part of the rotary movement being when the knife is in its lower position, whereby the cutting of the grass or other matter is more easily accomplished.

A further object of the invention is to provide a rotary movable knife which will also move laterally during the rotary motion, whereby a forward cutting effect is produced and a side shearing effect is produced.

A still further object of the invention is to provide means for giving a rotary motion to the cutting blade of a mowing machine, which blade is adapted to move in a horizontal plane.

In the accompanying drawings—Figure 1 is a section through a cutting machine embodying the invention, the same being taken on line 1—1 of Fig. 2; Fig. 2 is a top plan view of the mower shown in Fig. 1, certain parts being shown in section for better illustrating the construction; Fig. 3 is a fragmentary sectional view showing a slightly modified form of the invention to that shown in Fig. 1 in which certain of the connecting gears are eliminated; Fig. 4 is a top plan view of the structure shown in Fig. 3; Fig. 5 is a detailed fragmentary vertical central view through a further slightly modified form of the invention in which a cam structure in the form of a cross is used for producing the desired movement of the cutting blade; Fig. 6 is a top plan of another slightly modified form of the invention showing a horizontally movable knife and mechanism for operating the same; Fig. 7 is an enlarged detail fragmentary side view showing a ratchet mechanism whereby the knife is driven when the machine is moved forward and is allowed to remain stationary when the machine is moved backward.

Referring to the accompanying drawings by numeral, 1 indicates a traction wheel which may be of any desired kind, and which is provided with an internal gear 2 adapted to mesh with a pinion 3. On the opposite side of the frame 4 is a gear wheel 2, and also a pinion 3 and other mechanisms which are duplicates of the mechanisms associated with wheel 2 so that the description of wheel 2 and associated parts will equally apply thereto. Pinion 3 is mounted upon shaft 9, which shaft has rigidly connected therewith a comparatively large gear 6 which in turn meshes with pinions 7 and 8. These pinions are supported upon the framework 4 in any desired manner, as for instance by suitable bearings so that they may rotate the shafts 9 and 10 to which they are rigidly secured. Shafts 9 and 10 carry arms 11 and 12, which arms are pivoted at their outer ends to a power transmitting member 13, suitable pivotal pins 14 and 15 being used for providing a pivotal connection between arms 11 and 12 and power transmitting member 13. The outer end of member 13 is connected with a knife 16, which knife is caused to move in a circle as shown in Fig. 1, the forward movement of the knife being at the bottom of the circle so that the cutting operation will take place at the lower part of the circular movement of the knife. The two power transmitting members 13 are moved in unison so that the front edge of the knife 16 will continually extend transversely of the machine. It will be noted that the frame 4 is provided with an adjustable roller 18 which supports the frame at the desired height so that the grass or other matter being cut may be cut to any desired extent, namely, to provide a high cut or low cut, as desired.

In operation when it is desired to use the mower, roller 18 is adjusted so as to provide for a proper height of cut, and then the mower is moved over the ground by any suitable means, as for instance power applied to handle 19. Upon the rotation of the traction wheel 1 the pinions 3 will be rotated and also shaft 9 will be rotated. This will cause gear wheel 6 to revolve and in turn revolve the pinions 7 and 8 at a comparatively rapid speed. The movement of the pinions 7 and 8 is communicated to bars or power transmitting members 13 and from thence to cutter 16. When the machine is being moved forward the gear 2 will rotate the pinions 7, as clearly shown in Fig. 7, and will also rotate the shaft 9 through the bars or rollers 9′ and the ratchet 9″. By this construction and arrangement the shaft 9 is automatically drawn into clutch and out of clutch as the machine is moved forward and backward.

In Figs. 3 and 4 a modified form of the invention is shown wherein the cutter 16′ is not only given a rotary movement similar to the cutter 16 in Fig. 1, but is also given a lateral side movement as shown in dotted lines in Fig. 4. In order to secure this movement the bars 13′ are hinged at 19 whereby the sections 20 move pivotally, and are pivotally connected at 21 to knife 16′. A link 22 is pivotally connected at 23 to the frame 4′ and also pivotally connected at 24 to one of the sections 20, whereby as the section 20 moves forward and rearward the same is distorted in its movement so as to move transversely in addition. For instance, when the sections 20 move forward the pivotal connection 24 will be nearer the center of the machine than when moving to the rear, whereby the knife 16′ will move in the direction of the dotted arrow. As the section 20 moves to the rear the knife is again forced back to the position shown in full lines in Fig. 4. The bars 13′ are operated by arms 9′ and 10′, which arms carry counter-balances 26 and 27, arms 9′ and 10′ being connected with bar 13′ by suitable pins 28 and 29. The arms 9′ and 10′ are rigidly connected with pinions 30 and 31 which mesh with a gear wheel 32, which gear wheel is rigidly secured to the traction wheel 1′. The pinions 30 and 31 are supported in any desired way on frame 4′, as for instance by suitable shafts mounted in bearings in said frame.

In Fig. 5 a further slightly modified form of the invention is disclosed in which the traction wheel 33 has secured thereto a gear 34 meshing with pinions 35 and 36, which pinions are supported in any suitable manner, as for instance in a similar manner to that shown in Fig. 1. The pinions 35 and 36 carry arms 37 and 38, arm 37 being pivotally connected with a rod 39, while arm 38 has pivotally connected therewith blocks 40 and 41, which blocks slidingly fit into the arms of a cross shaped guide 42. Block 41 is designed to slidingly fit into the transverse guide 43, while block 40 is designed to slide in longitudinal guide 44. The rear of guide 44 accommodates shaft 39 so that the power transmitting member or bar 45 will always remain in a substantially horizontal position. By this construction and arrangement the knife 46 moves in the path of an ellipse instead of a circle. However, the blocks 40 and 41 may be adjusted in respect to each other, and thereby cause a different movement, that is, cause a greater or less ellipse as may be desired. By causing knife 46 to describe an ellipse, the forward cutting motion thereof is greater than when the knife operates as shown in Fig. 1. It is of course evident that the bar 45 could be made jointed as shown in Fig. 3 and means provided for causing a transverse movement in a similar manner to that shown in Fig. 3 without departing from the spirit of the invention.

Fig. 6 discloses another form of the invention in which the knife 47 moves continually in a horizontal plane, but the pins 48 and 49 describe circles whereby the knife 47 has what may be termed a circular movement similar to the movement of knife 16 shown in Fig. 1 except that it is in a horizontal plane instead of a vertical plane. This movement is caused by the special construction of the driving parts. As clearly illustrated in Fig. 6, the bars 50 and 51 are connected with arms 52 and 53 by suitable pivot pins, which arms are rigidly secured to pinions 54 and 55. The pinions 54 and 55 may be supported in any desired manner on a suitable frame (not shown), and are designed to continually mesh with a gear wheel 56, which gear wheel has formed on one side or rigidly secured thereto a beveled gear 57. Beveled gear 57 meshes with beveled gear 58, which beveled gear is rigidly secured to shaft 59. Shaft 59 carries a pinion 60 continually meshing with the teeth 61 formed on the inner surface of the rim of traction wheel 62. When the machine is moved forward the pinions 54 and 55 will be rotated, and as arms 52 and 53 revolve knife 47 will be given a transverse movement whereby a shearing action is produced as the knife engages the grass or other matter being cut.

What I claim is—

1. In a mower of the class described, a knife, a pair of supporting and operating bars rigidly connected with said knife, rotating arms connected to said bars for causing the same to move said knife in a circular path, a pinion rigidly connected with each of said arms, a gear wheel arranged between said pinions meshing with said pinions whereby the pinions turn in the same direction, a power pinion connected with said gear wheel, and a traction wheel provided with a gear meshing with said power pinion for rotating the power pinion when the traction wheel is moved.

2. In a mower of the character described, a knife, a pair of bars for supporting said knife, a pair of arms pivotally connected with each of said bars, a counterweight arranged on each of said arms, a pinion rigidly secured to each of said arms for rotating the arms, whereby the bar will be moved so as to move said knife in a rotary path, and a traction wheel formed with a gear structure meshing with said pinions for rotating the pinions when the traction wheel is rotated.

3. In a mower of the class described, a cutter, a pair of bars connected with said cutter, means for moving said bars so as to move said cutter in a circular path, and means acting on the outer end of said bars for causing the cutter to move transversely in addition to moving in a circular path.

4. In a mower of the class described, a cutter, a pair of bars connected with said cutter, revolving means for moving said bars so that the cutter will move in a circular path, each of said bars having the outer part pivotally connected with the inner part, and a link connected with a fixed pivot at one end, and at the other end pivotally connected with one of said bars at the outer part, whereby said bars are moved laterally in addition to being moved in a circular path.

In testimony whereof I have signed my name to this specification in the presence of two subscribing witnesses.

GUSTAV P. HELFRICH.

Witnesses:
  A. L. KITCHIN,
  G. H. EMSLIE.

Copies of this patent may be obtained for five cents each, by addressing the "Commissioner of Patents, Washington, D. C."